(12) United States Patent
Murphy

(10) Patent No.: US 10,043,160 B2
(45) Date of Patent: *Aug. 7, 2018

(54) METHOD AND APPARATUS FOR PROVIDING A BALANCE-VERIFIED ACH IDENTIFIER

(71) Applicant: Bank of America Corporation, Charlotte, NC (US)

(72) Inventor: Matthew D. Murphy, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 499 days.

This patent is subject to a terminal disclaimer.

(21) Appl. No.: 14/598,319

(22) Filed: Jan. 16, 2015

(65) Prior Publication Data

US 2016/0210603 A1 Jul. 21, 2016

(51) Int. Cl.
*G06Q 20/02* (2012.01)
*G06Q 20/40* (2012.01)
(Continued)

(52) U.S. Cl.
CPC .......... *G06Q 20/023* (2013.01); *G06Q 20/20* (2013.01); *G06Q 20/202* (2013.01); *G06Q 20/29* (2013.01); *G06Q 20/40* (2013.01); *G06Q 20/401* (2013.01)

(58) Field of Classification Search
USPC .................. 705/26, 44, 39, 40, 26.1, 37, 38; 235/380; 358/453; 340/5.41;
(Continued)

(56) References Cited

U.S. PATENT DOCUMENTS 6,647,376 B1 11/2003 Farrar et al.
6,970,843 B1 11/2005 Forte
(Continued)

OTHER PUBLICATIONS

"REDcard Gives You More," Target.com, retrieved on Jan. 12, 2015.
(Continued)

*Primary Examiner* — Tien C Nguyen
(74) *Attorney, Agent, or Firm* — Weiss & Arons LLP; Michael A. Springs, Esq.

(57) ABSTRACT

An apparatus for forming an auth-process determination for a point of sale ("POS")-purchase executed using a balance-verified automated clearing house ("ACH") identifier is provided. The ACH identifier may include identifier information configured as a pointer to a DDA account. A receiver may be configured to receive the balance-verified ACH identifier information and purchase information. The apparatus may retrieve DDA account information using previously-entered DDA account access information. The apparatus may calculate an auth-process determination based on the DDA account information and the purchase information. The apparatus may store, in real time, an auth-process determination indicator in the memory at the POS. The auth-process determination indicator corresponding to the auth-process determination. The apparatus may also cause to display the auth-process determination indicator on a POS screen. The apparatus may mirror the display of the auth-process determination indicator on a screen associated with the balance-verified ACH identifier.

16 Claims, 6 Drawing Sheets

(51) Int. Cl.
*G06Q 20/20* (2012.01)
*G06Q 20/22* (2012.01)

(58) Field of Classification Search
USPC .................................... 379/114.15; 709/203
See application file for complete search history.

(56) References Cited

U.S. PATENT DOCUMENTS

| | | | |
|---|---|---|---|
| 7,219,082 B2 | 5/2007 | Forte | |
| 7,899,742 B2* | 3/2011 | Benkert | G06Q 20/04 |
| | | | 705/39 |
| 8,027,917 B2 | 9/2011 | Easterly et al. | |
| 8,170,932 B1* | 5/2012 | Krakowiecki | G06Q 40/12 |
| | | | 705/30 |
| 8,175,908 B1* | 5/2012 | Anderson | G06Q 30/0201 |
| | | | 705/7.29 |
| 8,219,488 B2* | 7/2012 | Barry | G06Q 20/02 |
| | | | 705/26.1 |
| 8,260,645 B2* | 9/2012 | Banerjee | G06Q 20/20 |
| | | | 705/30 |
| 8,346,615 B2* | 1/2013 | Connors | G06F 21/57 |
| | | | 705/26.1 |
| 8,566,723 B2 | 10/2013 | Ueda et al. | |
| 8,583,548 B1* | 11/2013 | Goldstein | G06Q 30/04 |
| | | | 705/14.23 |
| 8,740,069 B2 | 6/2014 | Choy | |
| 8,924,292 B1* | 12/2014 | Ellis | G06Q 20/36 |
| | | | 705/41 |
| 9,355,530 B1* | 5/2016 | Block | G07F 19/201 |
| 2002/0198806 A1* | 12/2002 | Blagg | G06Q 40/00 |
| | | | 705/35 |
| 2003/0018550 A1* | 1/2003 | Rotman | G06Q 30/02 |
| | | | 705/35 |
| 2003/0037004 A1* | 2/2003 | Buffum | G06F 21/32 |
| | | | 705/51 |
| 2005/0192892 A1 | 9/2005 | Willard | |
| 2007/0030528 A1* | 2/2007 | Quaeler | G06F 17/24 |
| | | | 358/453 |
| 2007/0119918 A1* | 5/2007 | Hogg | G06Q 20/04 |
| | | | 235/380 |
| 2009/0177581 A1 | 7/2009 | Garcia et al. | |
| 2011/0125541 A1* | 5/2011 | Whitsitt | G06Q 10/06 |
| | | | 705/7.13 |
| 2011/0270618 A1* | 11/2011 | Banerjee | G06Q 30/02 |
| | | | 705/1.1 |
| 2012/0197801 A1 | 8/2012 | Jimenez | |
| 2013/0282488 A1* | 10/2013 | Blum | G06O 30/0255 |
| | | | 705/14.53 |
| 2015/0317629 A1* | 11/2015 | Mathew | G06Q 20/34 |
| | | | 705/44 |

OTHER PUBLICATIONS

"Nordstrom Rewards," Nordstrom.com, retrieved on Jan. 12, 2015.
"Shell Saver Card," Shell.com, retrieved on Jan. 12, 2015.
"Be Good With Your Money So You Can Be Expressive With Your Space," Mint.com, retrieved on Jan. 12, 2015.
"Did You Listen to Your Payments' Sixth Sense This Year?," Pymnts.com, retrieved on Jan. 12, 2015.
"Make Big Data Actionable & Enhance Your Customer Engagement," Yodlee.com, retrieved on Jan. 12, 2015.

* cited by examiner

METHOD AND APPARATUS FOR PROVIDING A BALANCE-VERIFIED ACH IDENTIFIER

FIELD OF TECHNOLOGY

This invention relates to Automated Clearing House ("ACH") transactions. More specifically, this invention relates to ACH transactions at a point-of-sale ("POS") and methods to increasing the credibility of ACH transactions for merchants.

BACKGROUND OF THE DISCLOSURE

ACH is an electronic network for financial transactions. ACH processes large volumes of credit and debit transactions in batches. ACH credit transfers may be used for direct deposit payroll and vendor payments. ACH transfers may include consumer payments on insurance premiums, mortgage loans, and other kinds of bills.

Businesses increasingly use ACH online and at physical POSs to have customers pay, rather than via credit or debit cards. ACH systems are also present in countries other than the US, where they may be alternatively referred to as low-value clearing systems.

The Federal Reserve Banks are collectively the nation's largest automated clearing house operator, and in 2005 processed 60% of commercial interbank ACH transactions. The Electronic Payments Network ("EPN"), the only private-sector ACH operator in the U.S., processed the remaining 40%. FedACH is the Federal Reserve's centralized application software used to process ACH transactions.

Reserve Banks and the EPN rely on each other for the processing of some transactions when either party to the transaction is not their customer. These interoperator transactions are settled by the Reserve Banks.

The ACH payment system is also used by consumers for payment of consumer transactions at a point of sale ("POS"). Merchants generally pay lower fees for ACH transactions compared to the credit and debit cards, but ACH generally provides merchants with fewer services and/or protections compared to credit and debit cards. Credit and debit card transactions typically involve payment networks and, while credit and debit card transactions may have higher fees than ACH transactions, credit and debit cards generally provide the merchant with an authorization and a guarantee of payment for an authorized transaction—i.e., debit and credit cards are a "good funds" model while ACH is not, making ACH less desirable.

Many merchants may find that ACH is problematic and presents insufficient credibility for POS transactions. While the customer is in the store at the POS, the merchant must decide if they are willing to risk if the customer presently has the existing funds or that the funds will exist at the time of ACH batch settlement. Settlement generally occurs at a point after the purchase has been made and the customer has left the merchant's location. If the customer does not have sufficient funds to cover the purchase at the time of ACH settlement, the transaction may fail. If the ACH transaction fails, the merchant must then find another means to collect the funds from the customer. This is similar to a bounced check.

It would be desirable to transact at a POS using ACH while enhancing the merchant's knowledge about the customer's funds availability.

It would be further desirable to transact at a POS using an ACH while limiting merchant exposure to certain network irregularities, such as unforeseen charges and/or network failures.

It would also be desirable to provide an electronic platform which supports ACH customer transactions at a POS at a transaction cost that is relatively lower than the transaction cost associated with existing credit card or debit card transactions while providing enhanced ability to determine the credibility of the transaction.

SUMMARY OF THE INVENTION

An apparatus for forming a credibility score and a preferably merchant-controlled auth-process determination for a point-of-sale ("POS") purchase executed using a balance-verified automated clearing house ("ACH") identifier is provided.

For the purposes of this application, a balance-verified ACH identifier may be understood to be a device, such as a mobile device or plastic card, that stores information and that may be used as a financial instrument to execute a transaction. In certain embodiments, the ACH identifier may be configured as a pointer to a Demand Deposit Account ("DDA") account. A DDA may be a checking account, a money market account or other account. Most DDAs let a user withdraw funds, or authorize funds withdrawal, independent of advance notice. However, the term DDA may also include accounts that require six days or less of advance notice to withdraw funds.

The apparatus may receive identifier information from the balance-verified ACH identifier, where the identifier information is linked to the DDA, and purchase information.

In response to the receipt of the balance-verified ACH identifier information and the purchase information, the apparatus may retrieve DDA account information. The retrieval may be implemented using previously-entered DDA account access information.

The apparatus may be further configured to gain access to, and retrieve, additional purchaser financial information. The additional purchaser financial information may include one or more of the following: present user liquidity (such as bank accounts other than the DDA account), possible near-term financial health volatility (such as account alert information), general overview of user financial health (e.g., a credit score), present user liquid and illiquid financial health (e.g., a net worth valuation), and at least one predictive indicator of user future financial health (e.g., a user financial trend).

The apparatus may also be configured to store, in real time, an auth-process determination indicator in the memory at the POS.

The apparatus may be further configured to cause to display the auth-process determination indicator to a POS operator in order to auth-decision the purchase.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
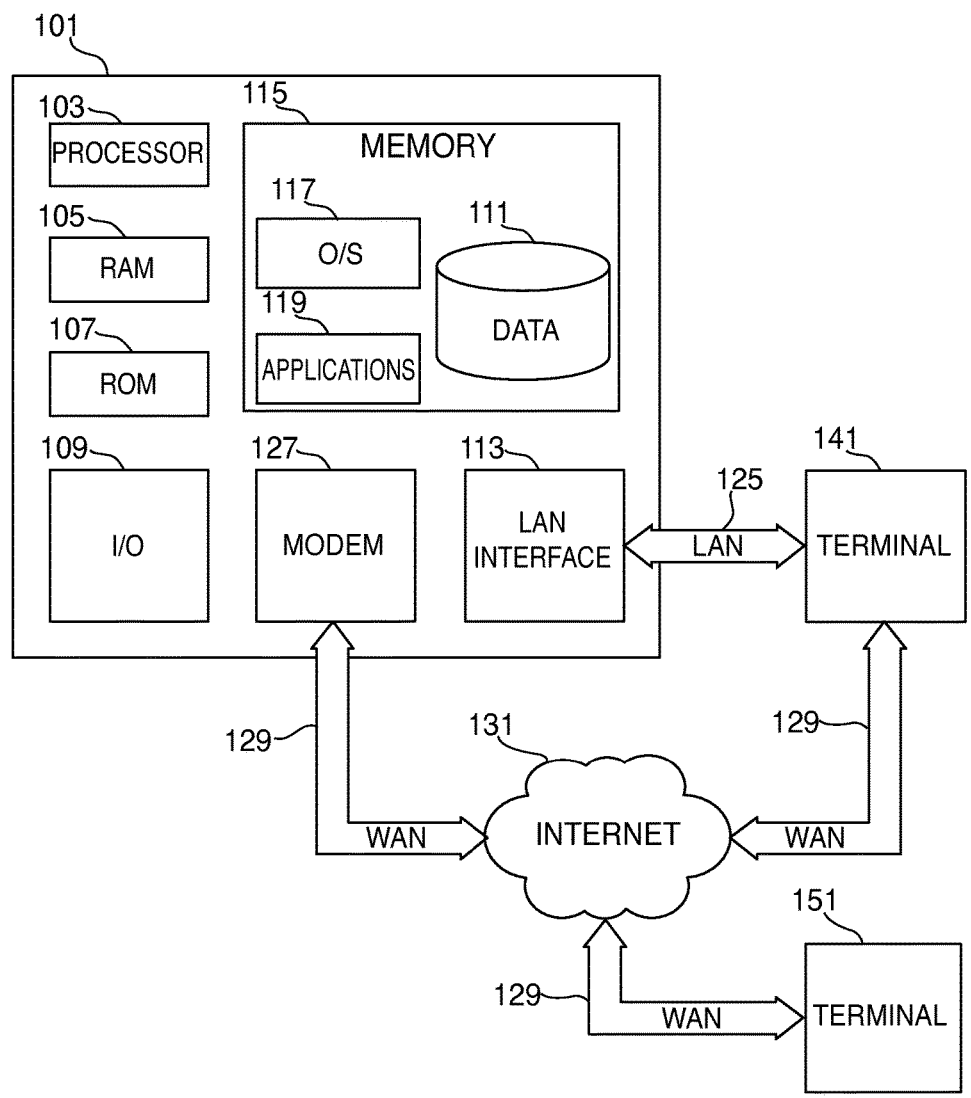
FIG. 1 shows an illustrative apparatus for use with methods in accordance with principles of the invention.

Apparatus and methods for forming an auth-process determination for a point of sale ("POS")-purchase executed using a balance-verified automated clearing house ("ACH") identifier are provided. The ACH identifier may be configured as a pointer to a DDA account.

The apparatus may include a processor and a receiver. The receiver may be configured to receive identifier information from the balance-verified ACH identifier. The identifier information may be linked to the DDA. The receiver may also be configured to receive purchase information.

The apparatus may also include machine-readable memory. In response to the receipt of the balance-verified ACH identifier information and the purchase information, the processor may be configured to retrieve DDA account information. The retrieval may be implemented using previously-entered DDA account access information.

The processor may be further configured to retrieve additional purchaser financial information.

The processor may be further configured to store, in real time, an auth-process determination indicator in the memory at the POS. The processor may also be configured to cause to display the auth-process determination indicator to a POS operator in order to auth-decision the purchase.

In certain embodiments, the apparatus may be configured to display to a POS operator the additional purchaser financial information. In some embodiments, the apparatus may be configured to cause to display to a POS operator the additional purchaser financial information such that the display is redacted from presenting actual values associated with the additional purchaser financial information and, in fact, replaces such values with a representative background color, such as red, yellow or green depending on the conditions of the financial information.

In some embodiments, the apparatus may be further configured to cause to display to a POS operator a single one of the user liquidity, the possible near-term financial health volatility, the general overview of user financial health, the present user liquid and illiquid financial health. The processor may or may not be further configured to redact the numeric information from the display of at least one of the foregoing.

In some embodiments, the balance-verified ACH identifier may be a user-handheld device and the identifier information may be further configured to cause to display the auth-process determination indicator on the user-handheld device substantially simultaneously to, or at a different time from, displaying the auth-process determination indicator to the POS operator.

In certain embodiments, the balance-verified ACH identifier may be a card and the information may be further configured to cause to display the auth-process determination indicator on a user-handheld device such as a card or other identifier substantially simultaneously to displaying the auth-process determination indicator to the POS operator.

In certain embodiments, the processor may be further configured to determine baseline values—e.g., from 30 days previous, 60 days previous, 90 days previous or some other suitable indicator(s), or combination of indicators, of baseline value—for the DDA account information and/or the additional purchaser financial information. After determining baseline values for the DDA account information and/or the additional purchaser financial information, the processor may be further configured to select for display, or select for a visual indication that causes said section to stand out from the surrounding section, only the DDA account information and/or the additional purchaser financial information that differs by the greatest magnitude from the baseline values.

In some embodiments, the processor may be further configured to determine a recent change to the DDA account and to display an alert corresponding to the recent change to the DDA account.

Some embodiments may include a method for forming an auth-process determination for a point of sale ("POS")-purchase executed using a balance-verified automated clearing house ("ACH") identifier. The identifier, which may be a handheld device or an ACH card, may also include information for logging in to the user's DDA account. In certain embodiments, such a login may be a view-only login which, when transmitted to the POS, allows the POS to retrieve information from the DDA account, but not to execute a transaction within the DDA account.

In other embodiments, the login to the DDA account but a fully-operational login but may only be used by the merchant to retrieve balance, and other, information. It should be noted that the ability to retrieve balance, and other, information may preferably exist independently of the ACH network and/or the specific ACH transaction being authorized. Rather, the balance, and other, information may be received via a mechanism distinct from the ACH network. Alternatively, communication rails that are used to receive the balance, and other, information may be used to leverage the ACH network such that the communication rails may serve as a gateway for access to the ACH network.

The method may include receiving the balance-verified ACH identifier information and the purchase information.

In response to the receipt of the identifier information and the purchase information, the method may further include retrieving DDA information. The retrieving may be implemented using previously-entered DDA account access information.

The method may also include calculating an auth-process determination based on the DDA account information and the purchase information.

Thereafter, the method may further include storing, using the processor, in real time, an auth-process determination indicator in the memory at the POS. The auth-process determination indicator may preferably correspond to the auth-process determination.

The method may also include causing to display, using the processor, the auth-process determination indicator on a POS screen and mirroring the display of the auth-process determination indicator on a screen associated with the balance-verified ACH identifier.

In some embodiments, the method may include duplicating information displayed on the POS screen at an administrator screen for an auth-process decision. In certain embodiments, the duplicating may be preferably performed only in response to a POS operator selection.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, the embodiments may be embodied as a method, a data processing system, or a computer program product. Accordingly, the embodiments may take the form of an entirely hardware embodiment, an entirely software embodiment or an embodiment combining software and hardware aspects.

Furthermore, embodiments may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Exemplary embodiments may be embodied at least partially in hardware and include one or more databases, receivers, transmitters, processors, modules including hardware and/or any other suitable hardware. Furthermore, operations executed may be performed by the one or more databases, receivers, transmitters, processors and/or modules including hardware.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
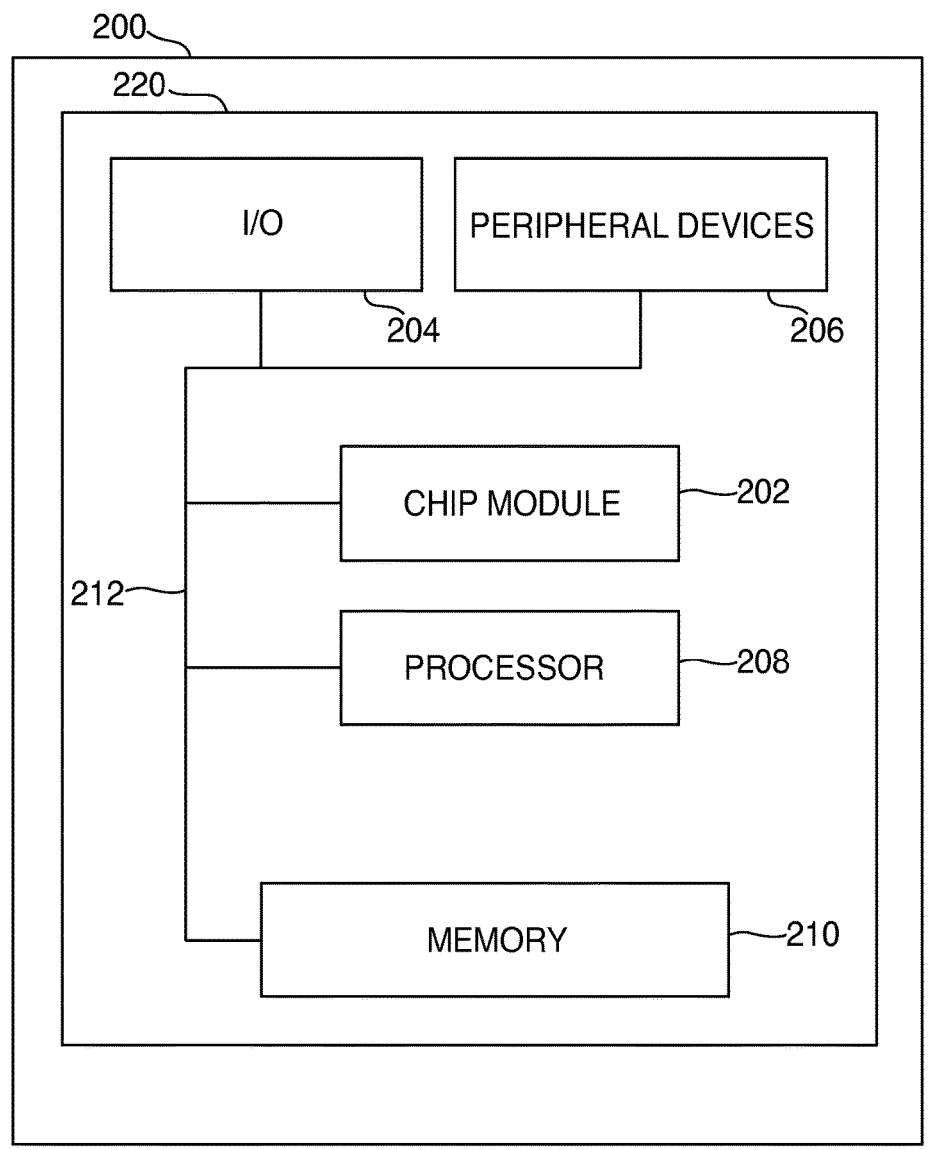
FIG. 2 shows an illustrative apparatus for use with methods in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may test submitted information for validity, scrape relevant information, aggregate user financial data and/or provide an auth-determination score(s) and machine-readable memory 210.

Machine-readable memory 210 may be configured to store in machine-readable data structures: information pertaining to a user, information pertaining to an account holder and the accounts which he may hold, the current time, information pertaining to historical user account activity and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
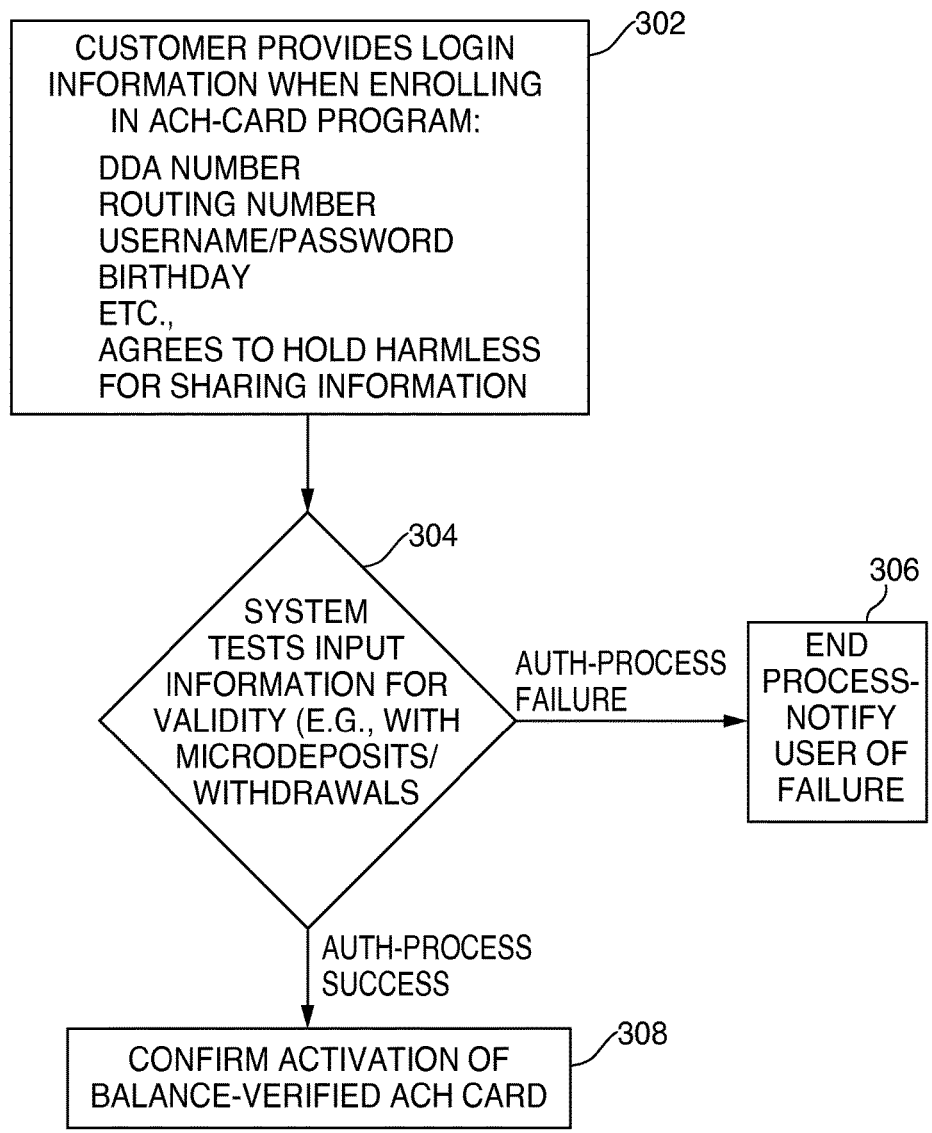
FIG. 3 is an illustrative flow diagram related to enrollment and activation of systems and methods according to certain embodiments.

FIG. 3 shows enrollment and activation of a balance-verified ACH identifier system and apparatus. Step 302 shows that, in order to enroll, a customer provides relevant information to the system. Such information may include a suitable bank account such as a demand deposit account ("DDA") number.

Relevant information may also include a routing/transit number for the DDA account, a username and password for accessing an online portal associated with the DDA account, a user birthday, as well as any other suitable information needed for logging in to the DDA account or other accounts associated with the user.

Furthermore, the enrollment may require a participant to agree to "hold-harmless" the provider of a balance-verified ACH card. Such a hold harmless agreement may require that the user will hold the provider harmless from damage suffered as a result of unintended, albeit unauthorized, sharing of information as a result of use of the card.

At step 304, the system preferably performs an auth-process on one or more accounts held by the user. Such an auth-process may test input information for validity.

In one embodiment, such a validation test may be carried out on the user DDA account by making micro-deposits and/or micro-withdrawals from the account using the information provided by the user. Such micro-deposits and/or micro-withdrawals may confirm that the DDA account is in fact associated with the user and that the information provided by the user is sufficient to timely retrieve the account information.

Such validation testing may preferably occur prior to implementation of the identifier as a purchase instrument.

Step 306 shows that, in the event of an auth-process failure, the enrollment may terminate. In addition, the user may be notified of the termination of the enrollment process.

Step 308 shows that, in the event of an auth-process success, the system may confirm activation of the balance-verified ACH card.

Figure 4:
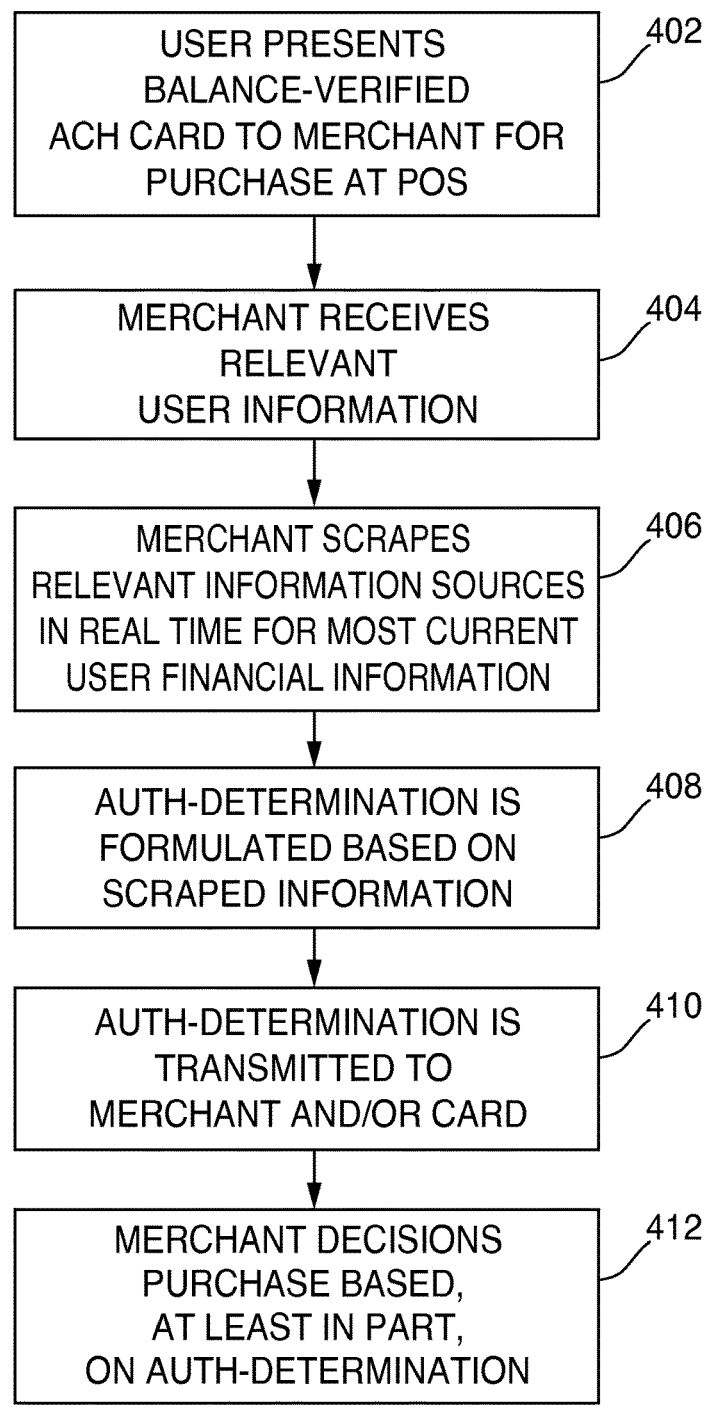
FIG. 4 is an illustrative flow diagram related to implementation of systems and methods according to certain embodiments.

FIG. 4 shows a flow diagram illustrating an embodiment of an implementation of the balance-verified ACH card (or a mobile device, or other ACH identifier, with information on the device identifying a balance-verified ACH account associated with the user). Step 402 shows that the user presents, to pay for an intended purchase at a POS, a balance-verified ACH card (or a mobile device, or transmits information using a mobile device, or pays using some other suitable ACH identifier).

At step 404, the merchant receives the relevant user information. In response to the merchant receiving relevant user information, and receiving the purchase information at the POS, the merchant's system may scrape relevant information sources in real time for the most current user financial information.

"Scrape" is a computer software technique of extracting information from websites. For the purposes of this application, the term "scrape" should be understood to include logging in to a user's financial websites using the user's logins and access information associated therewith. This is done with the user's pre-approval and previously-registered permission and should preferably be supported with legal documentation supporting the permission. Scraping according to the embodiments should preferably recognize the data structures of the pages being scraped and use a script that extracts and transform content from the scraped websites. The transformed content may then be preferably aggregated for presentation to a merchant and/or user. In certain embodiments, the scraped information may preferably be stored locally for aggregation and arrangement.

At step 408, an auth-determination is performed. The auth-determination is preferably formulated based on scraped information. The auth-determination may be standard or customized based on the merchant's desired level of credibility. At step 410, the auth-determination is preferably transmitted to merchant and/or card (or mobile device associated with the transaction.)

At step 412, the merchant decisions the purchase based, at least in part, on the auth-determination. Alternatively, a user can swipe his card in a kiosk at the time of entry to the merchant's brick and mortar establishment and the kiosk will inform the user how much the user can safely spend without risking a purchase denial.

Figure 5:
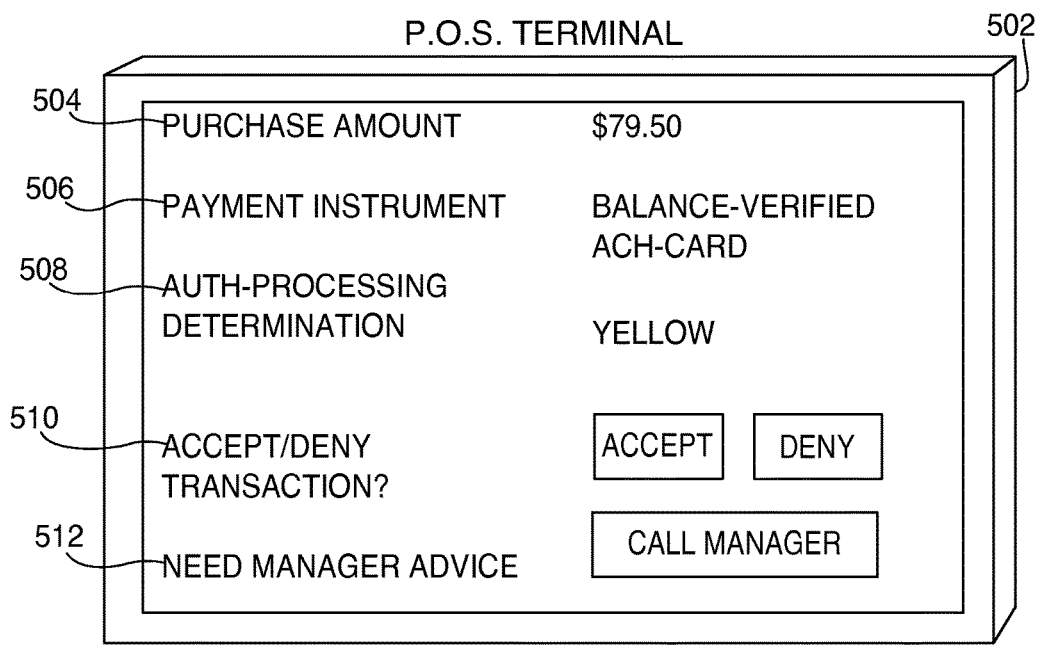
FIG. 5 is an illustrative POS screen for use with certain embodiments.

FIG. 5 shows an exemplary POS terminal screen 502 according to some embodiments. Screen 502 may include, for example, a purchase amount 504, a payment instrument identifier 506, an auth-process determination indicator 508 and an accept/deny transaction selector 510.

Screen 502 may also include a "need manager" advice selector 512. Selector 512 may be appropriate to select in circumstances where an auth-decision is not readily apparent to an associate controlling the auth-decision.

In certain embodiments, the POS may be pre-configured to authorize the purchase in response to a higher than threshold score on the indicator 508. For example, in certain embodiments, the POS may be pre-configured to successfully authorize any purchase made with a balance-verified ACH-identifier that scores a green light indication. It should be noted that, in some embodiments, the auth-decision may be formulated in conjunction with the merchant's previously existing customer data.

Figure 6:
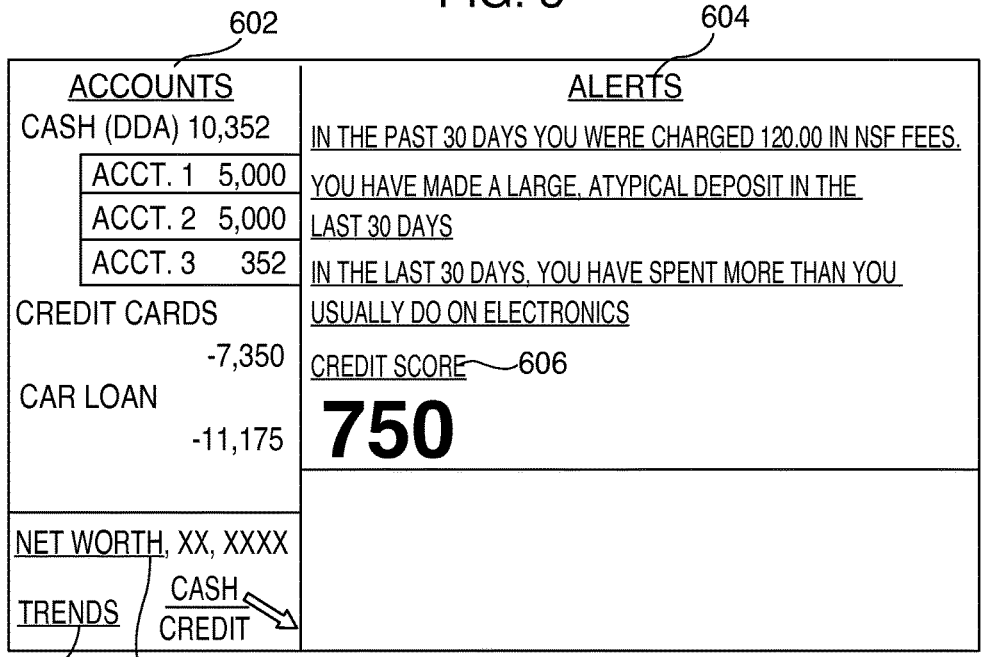
FIG. 6 is a first illustrative graphical user interface ("GUI") according to certain embodiments.

FIG. 6 shows a graphical user interface ("GUI") for use with systems and methods according to certain embodiments. FIG. 6 may be generally understood to arrange a user's financial information. Such an arrangement, upon presentation to a merchant, may preferably allow a merchant to easily and seamlessly perform an auth-decision on a purchase request by a user. Such a GUI may preferably be presented at a POS and/or may be shifted from a POS to a manager station for review by another layer(s) of merchant management. It should be noted that the GUI shown in FIG. 6 may have obtained the information set forth therein using the above-described scraping methodology or using some other suitable information retrieval system or method.

The GUI shown in FIG. 6 preferably includes accounts 602. Accounts 602 may include a display of all the relevant, preferably liquid, accounts associated with the user.

Section 604 may include alerts. Alerts 604 may display recent anomalous financial behavior exhibited by the user. Section 604 shows, for example, that the user has recently been charged $120.00 in insufficient funds fees ("NSF"); that the user may have made a large, atypical deposit in the last 30 days; and that the user spent more than he or she typically spends on electronics in the last 30 days.

Section 606 shows a credit score. The credit score may be reviewed by a merchant in order to determine the general financial health of the user associated with the balance-verified ACH card. The credit score may have been retrieved using known methods and/or processes of credit score retrieval.

Section 608 may show a "net worth" calculation of the user. Section 608 may be reviewed in combination with section 606 to give the merchant both a more specific understanding of the user's financial picture as well as a general understanding of the user's financial picture. Together, sections 606 and 608 can provide a merchant multi-dimensional support for auth-decisioning the purchase.

Section 610 may display a trend associated with the financial situation of the user. Such a trend, together with the relatively more specific understanding of the user financial health shown in net worth 608 and the relatively more general understanding of the user financial health shown in credit score 606, may provide an indication of the future financial health of the user to the merchant. Such an understanding may be critically important to auth-decisioning a purchase because such an understanding indicates, at least in part, whether the user's present financial situation will, absent unforeseen circumstances, tend to maintain itself for a sufficiently long period of time in order to pay for the purchase avoids a charge-off for the purchase.

The table below presents the various exemplary sections shown in FIG. 6 and their representative user indications.

TABLE 1

| Exemplary Financial Indicators | User Financial Health Determinants |
| --- | --- |
| Accounts | Present User Liquidity |
| Alerts | Possible Near-term Financial Health Volatility |
| Credit Score | General Overview of User Financial Health |
| Net Worth | Present User Liquid and Illiquid Financial Health |
| Trends | Predictive Indicator of User Future Financial Health |

For the purposes of this application, it should be understood that the various sections shown in FIG. 6 are only exemplary and that more or less sections may be considered within the scope of this application.

In certain embodiments, the information in steps 602, 604, 606, 608, 610, etc. may be normalized and condensed in a single rating of the transaction and provided as such to the merchant.

Figure 7:
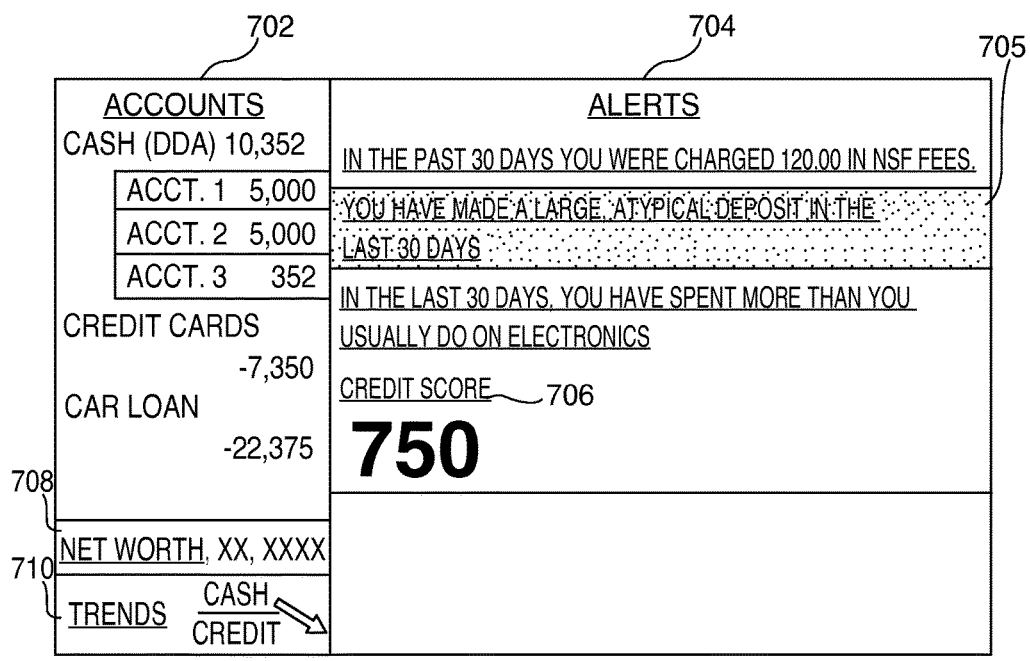
FIG. 7 is a second illustrative graphical user interface ("GUI") according to certain embodiments.

FIG. 7 shows that, in certain embodiments, one or more individual sections on the GUI shown in FIG. 6 may be emphasized by shading the background and/or changing the coloring of the emphasized section, or implement the emphasis using other known technological means. Such emphasis may preferably inform the merchant that one of the sections may deserve disproportional attention in view of the atypical behavior illustrated therein.

Specifically, FIG. 7 shows that one of the alerts indicates that the merchant should pay particular attention to the fact that a large, atypical, deposit has been made in the last 30 days in the user's primary DDA account. Such a deposit may conceivably have been made for the purpose of defrauding the merchant.

For example, the user may have made the deposit to defraud the merchant's system by indicating to the merchant's system that the user has sufficient funds in the DDA account to make good on the purchase, but, in actuality the funds were in the user's possession only temporarily. Such temporary funds may be removed prior to the execution of the ACH debit associated with the purchase at the merchant. Such removal may cause a current payment on the ACH to the merchant to fail. Accordingly, such activity can be brought to the merchant's attention in the highlighted portion 705 of alerts' section 704 so the merchant can attribute extra significance to the anomalous user activity.

Thus, methods and apparatus for providing a balance-verified ACH card for use are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart payment system for dynamic, reduced-risk decisioning of a point-of-sale ("POS") purchase executed using a balance-verified automated clearing house ("ACH") identifier, the ACH identifier configured as a pointer to a DDA account of a user, the system comprising:
   a computer-readable medium storing computer-readable instructions for:
      receiving from a subscriber:
         subscriber login information for the DDA account; and
         authorization for using the login information in a read-only mode to access subscriber financial health determinant information; and
      providing an application to the subscriber for installation on a remote subscriber device, the application including machine-readable instructions for presenting, via a device display, an auth-process determination indicator; and
   a smart POS terminal including:
      a processor;
      an electronic display controlled by the processor; and
      apparatus for executing the dynamic decisioning in real-time, the apparatus including:
         a network interface controlled by the processor;
         a POS terminal receiver, the receiver configured for receipt of:
            identifier information from the balance-verified ACH identifier, said identifier information linked to the DDA account; and
            purchase information including a value of the purchase, the receiver controlled by the processor and including at least one of:
               an identifier scanner configured for the receipt of the identifier information;
               a purchase scanner configured for the receipt of the purchase information;
               a microphone;
               a keypad;
               a touch screen; and
               a stylus; and
         machine-readable memory storing instructions for instructing the processor to, in response to the receipt of the identifier information and the purchase information and based on the financial health determinant information, in real time, execute the dynamic decisioning including:
            logging in, via the interface, using the received login information and based on the received authorization, in the read-only mode, to the DDA account;
            retrieving, via the interface, DDA account information by scraping, while in the read only mode, the financial health determinant information from web pages associated with the DDA account, the scraping including:
               recognizing data structures of the web pages being scraped; and
               using a script to extract and transform content from the data structures;
            retrieving, based on the transformed content, additional purchaser financial information indicating a first, partial estimate of a likelihood of failure of settlement of the purchase, the additional financial information including present user liquidity, possible near-term financial health volatility, general overview of user financial health, present user liquid and illiquid financial health, and at least one predictive indicator of user future financial health;

evaluating, based at least in part on the retrieved DDA account information and the transformed content whether at least one atypical deposit has been made to the DDA account in at least one predetermined time-window prior to the receipt of the identifier information and the purchase information, the atypical deposit indicating a likelihood of attempted fraudulent activity;

calculating, based on both the first estimate and the atypical deposit, a second estimate of the likelihood of the failure; and generating an auth-process decisioning alert, including an auth-process determination for the purchase based on the second estimate, the alert to activate:

the processor to:

store, in real time, the auth-process determination indicator in the memory of the POS terminal, the determination indicator based on the auth-process determination;

cause to display, on the POS terminal display, the auth-process determination indicator to a POS operator in order to enable the POS operator to modify the auth-process determination based on received qualifying data; and auth-decision the purchase in real time based on the auth-process determination, thereby preventing the fraudulent activity and thereby reducing risk of settlement failure; and the application on the remote subscriber device to cause presentation of the auth-process determination indicator on the device display, the remote device including a wireless handheld device of the user, the handheld device including the device display, the presentation substantially simultaneous to the auth-decisioning of the purchase.

2. The system of claim 1, wherein the processor is further configured to cause to display to the POS operator the additional purchaser financial information.

3. The system of claim 1, wherein the processor is further configured to cause to display to the POS operator, via the terminal display, a representative summary of the additional purchaser financial information the summary redacted from actual values associated with the additional purchaser financial information and replacing the actual values with a representative background color.

4. The system of claim 1, wherein the processor is further configured to cause to display to a POS operator a single one of the user liquidity, the possible near-term financial health volatility, the general overview of user financial health, the present user liquid and illiquid financial health, and the processor is further configured to redact numeric information from the display.

5. The system of claim 1, wherein the processor is further configured to cause to display to a POS operator a single one of the user liquidity, the possible near-term financial health volatility, the general overview of user financial health, the present user liquid and illiquid financial health.

6. The system of claim 1, wherein the balance-verified ACH identifier is the user-handheld device.

7. The system of claim 1, wherein the balance-verified ACH identifier is a card.

8. Smart terminal apparatus for dynamic, real-time, reduced-risk auth-decisioning of a point of sale ("POS")-purchase executed using a balance-verified automated clearing house ("ACH") identifier, the ACH identifier configured as a pointer to a DDA account, the apparatus comprising:

a processor;

a computer-readable medium storing computer-readable instructions for:

receiving from a subscriber:

subscriber login information for the DDA account; and authorization for using the login information in a read-only mode to access subscriber financial health determinant information; and providing an application to the subscriber for installation on a remote subscriber device, the application including machine-readable instructions for presenting, via a device display, an auth-process determination indicator;

an electronic display controlled by the processor;

a network interface controlled by the processor; and a receiver, the receiver configured to receive via one of a wired and wireless connection:

balance-verified ACH identifier information from the ACH identifier; and purchase information; and machine-readable memory;

wherein, in response to the receipt of the identifier information and the purchase information, the processor is configured to, in real time, reduce a risk of failure of settlement of the purchase by:

logging in, in a read-only mode, to the DDA account; and while logged into the DDA account, extracting risk-relevant DDA account information by:

scraping financial health determinant information from web pages associated with the DDA account;

recognizing data structures of the web pages being scraped; and using a script to extract and transform risk-relevant content from the data structures;

retrieving, based at least in part on the transformed content, additional risk-predictive purchaser financial information including at least one of present user liquidity, possible near-term financial health volatility, general overview of user financial health, present user liquid and illiquid financial health, and at least one predictive indicator of user future financial health;

storing an auth-process determination based at least in part on the additional purchaser financial information and an auth-process determination indicator in the memory at the POS, said auth-process determination indicator at least partially corresponding to the risk as determined in the auth-process determination;

determining a change to the DDA account within the last 30 days that indicates an intent of the user to ensure a positive auth-decision for the purchase;

generating a first alert corresponding to the change to the DDA account, the alert to activate a POS processor to display a representation of the change, to a POS operator responsible for the auth-decision of the purchase;

wherein the processor is configured to generate a second alert to activate a handheld device of the user to display the auth-process determination indicator substantially simultaneously to the displaying of the auth-process determination indicator and the additional purchaser information to the POS operator in order to auth-decision the purchase; and facilitating, via a dedicated auth-decisioning GUI, the auth-decisioning of the purchase by the POS operator based on the auth-determination and the alert.

9. The apparatus of claim 8, wherein the processor is configured to remove the value(s) in the additional purchase information and present a pre-determined color in the background of the auth-process determination indicator in order to enable the POS operator to auth-decision the purchase, wherein the pre-determined color corresponds to the removed value.

10. The apparatus of claim 8, wherein the balance-verified ACH identifier is the user-handheld device.

11. The apparatus of claim 8, wherein the processor is further configured to cause to display to the POS operator the additional purchaser financial information.

12. The apparatus of claim 8, wherein the processor is further configured to determine baseline values for the additional purchaser financial information and to select for display only the additional purchaser financial information that differs by the greatest magnitude from the baseline values.

13. Apparatus for enabling a point-of-sale (POS) terminal to block, in real time, high risk Automated Clearing House ("ACH") transactions and execute, in real time, low risk ACH transactions, the apparatus comprising:

one or more non-transitory computer-readable media storing computer-executable instructions which, when executed by a processor on a computer system, dynamically reduce risk of purchase-settlement failure by performing a method for forming an auth-process determination for a POS-purchase executed using a balance-verified automated clearing house ("ACH") identifier, the ACH identifier including a card including identifier information, said identifier information configured as a pointer to a DDA account, the method including:

receiving from a subscriber:
subscriber login information for the DDA account; and
authorization for using the login information in a read-only mode to access subscriber financial health determinant information;

providing an application to the subscriber for installation on a remote subscriber device, the application including machine-readable instructions for presenting, via a device display, an auth-process determination indicator;

receiving, using a point-of-sale ("POS") terminal:
the balance-verified ACH identifier information; and
purchase information; and in response to the receipt of the identifier information and the purchase information, using the processor to:

dynamically assess the risk by:
accessing, in real time and in a read-only mode, the DDA account; and
while logged into the DDA account, scraping financial health determinant information from one or more web pages displaying the DDA account, the scraping including:
recognizing data structures of the web pages being scraped; and
using a script to extract and transform content from the data structures; and
identifying a change to the DDA account indicative of a temporary deposit;

dynamically warn a POS operator of the assessed risk by:
generating an alert corresponding to the change to the DDA account;
generating, using the processor, the auth-process determination based on the DDA account information, the purchase information and the alert;
storing, using the processor, in real time, an auth-process determination indicator in machine-readable memory at the POS, said auth-process determination indicator corresponding to the auth-process determination; and
causing to display, using the processor, the auth-process determination indicator on a first, POS screen;

notify a customer associated with the identifier of the auth-process determination by causing to display the auth-process determination indicator on a second screen, the second screen associated with the balance-verified ACH identifier, the identifier including the card; and dynamically reducing the risk by auth-decisioning the purchase in real time based on the auth-determination.

14. The apparatus of claim 13, further comprising duplicating, in response to a POS operator selection, information displayed on the POS screen at an administrator screen for an auth-process decision.

15. The apparatus of claim 13 further comprising:
retrieving, using the processor, additional purchaser financial information including at least one of present user liquidity, possible near-term financial health volatility, general overview of user financial health, present user liquid and illiquid financial health, and at least one predictive indicator of user future financial health; and
calculating, using the processor, the auth-process determination based, at least in part, on the additional purchaser financial information.

16. The apparatus of claim 13, wherein the balance-verified ACH identifier is a user-handheld device and the method further includes displaying the auth-process determination indicator on the user-handheld device.

* * * * *